Patented Feb. 28, 1928.

1,660,839

UNITED STATES PATENT OFFICE.

HARRY C. HERENDEEN, OF CRYSTAL LAKE, ILLINOIS.

PROCESS OF PREPARING DOUGH.

No Drawing.    Application filed September 20, 1926.    Serial No. 136,733.

The object of the present invention or discovery is to improve products made from flour by a simple treatment of ordinary flour or dough made therefrom, which treatment does not necessarily require any different steps or operations, as to number, than ordinarily employed.

I have discovered that if ordinary wheat flour, or dough made therefrom, is stirred or mixed or agitated in an atmosphere of steam, or steam is injected into the mass and thoroughly distributed through the same while mixing or stirring is going on, there will be a bleaching of the flour and a partial rupturing of the starch cells; whereby the finished products will have all of the desirable characteristics of those made from flours that have gone through a special milling process for the purpose of rupturing the starch cells. Furthermore, dough thus treated or from flour treated in this way, will ferment more quickly, and therefore the dough will be ready for cooking or baking in a shorter time than is usually required.

My invention or discovery may therefore be said to have for its object a simple and novel treatment of flour and dough to quicken the process of fermentation.

No special apparatus is required for carrying out my invention or discovery. Flour may be stirred in a closed receptacle into which steam is delivered, or flour or dough may be stirred in a mixing machine having mixing elements provided with steam passages and outlets, as have heretofore been used for the purpose of aerating dough; so that the steam will enter directly into the interior of the mass that is being stirred.

I claim:

1. The process of treating finished flour at some stage in the preparation of dough therefrom which consists in stirring the same in contact with steam.

2. The process of treating dough which consists in introducing steam into the interior of a mass thereof while the same is being stirred.

3. The step in the preparation of dough which consists in stirring the ingredients in the presence of steam.

In testimony whereof, I sign this specification.

HARRY C. HERENDEEN.